(12) United States Patent
de Windt et al.

(10) Patent No.: US 11,395,562 B1
(45) Date of Patent: Jul. 26, 2022

(54) CARTRIDGE IGNITION SYSTEM

(71) Applicants: Tirso K. R. de Windt, Willemstad (CW); José Gonçalves do Estreito, Willemstad (CW)

(72) Inventors: Tirso K. R. de Windt, Willemstad (CW); José Gonçalves do Estreito, Willemstad (CW)

(73) Assignee: WIÇKO BV, Willemstad (CW)

( * ) Notice: Subject to any disclaimer, the term of this patent is extended or adjusted under 35 U.S.C. 154(b) by 0 days.

(21) Appl. No.: 17/582,876

(22) Filed: Jan. 24, 2022

Related U.S. Application Data

(60) Provisional application No. 63/237,332, filed on Aug. 26, 2021.

(51) Int. Cl.
  *A47J 37/07* (2006.01)
  *F23Q 2/18* (2006.01)

(52) U.S. Cl.
  CPC .............. *A47J 37/079* (2013.01); *F23Q 2/18* (2013.01)

(58) Field of Classification Search
  CPC ................................. A47J 37/079; F23Q 2/18
  See application file for complete search history.

(56) References Cited

U.S. PATENT DOCUMENTS

| | | | | |
|---|---|---|---|---|
| 2,548,379 A | * | 4/1951 | Lammersen | C10L 5/44 126/25 B |
| 2,622,017 A | * | 12/1952 | Bramhall | A47J 37/0768 431/126 |
| 3,279,900 A | * | 10/1966 | Naples | C10L 11/04 44/506 |
| 3,448,735 A | * | 6/1969 | Palmer | A47J 37/0768 126/25 R |
| 6,328,028 B1 | * | 12/2001 | Cayse | A47J 37/079 126/25 B |
| 2008/0190410 A1 | * | 8/2008 | Krippelz | A47J 37/079 126/25 B |
| 2017/0181578 A1 | * | 6/2017 | Alanis Moreno | C10L 5/34 |
| 2019/0117017 A1 | * | 4/2019 | West | A47J 37/0704 |
| 2021/0235928 A1 | * | 8/2021 | West | A47J 37/079 |

FOREIGN PATENT DOCUMENTS

| | | | |
|---|---|---|---|
| DE | 10108328 | * | 8/2002 |
| DE | 202016006557 | * | 10/2016 |
| EP | 0380086 | * | 8/1990 |

* cited by examiner

*Primary Examiner* — Alfred Basichas
(74) *Attorney, Agent, or Firm* — Jason T. Daniel, Esq.; Daniel Law Offices, P.A.

(57) ABSTRACT

A cartridge ignition system includes a main body having a plurality of walls that define a hollow interior space, and an ignition cartridge that is positioned within the interior space. The ignition cartridge includes a plurality of bracing elements that are joined together via a plurality of elongated rods, and an elongated wick that extends along the length of the ignition cartridge. The wick includes a layered construction that is designed to burn longitudinally along the length of the ignition cartridge. A fuel source is positioned within the main body and is in communication with the plurality of bracing elements and elongated rods. The wick is positioned along a central portion of the ignition cartridge and is separated from the fuel source by an air gap. The main body and ignition cartridge are constructed from combustible materials and apertures along the main body permitting airflow during system operation.

15 Claims, 7 Drawing Sheets

CARTRIDGE IGNITION SYSTEM

CROSS-REFERENCE TO RELATED APPLICATIONS

This application claims the benefit of U.S. Application Ser. No. 63/237,332 filed on Aug. 26, 2021, the contents of which are incorporated herein by reference.

TECHNICAL FIELD

The present invention relates generally to charcoal and wood burning grills, and more particularly to a cartridge ignition system for use with grills and other such appliances.

BACKGROUND

The statements in this section merely provide background information related to the present disclosure and may not constitute prior art.

Natural fuel sources such as wood and charcoal, for example, have been used for generations to provide heat and to cook food. Today, processed wood chips and charcoal briquettes are among the most commonly utilized fuel sources for cooking in appliances such as barbecue grills due to their relatively low cost and ability to provide sustained heat to the food being cooked. For this reason, charcoal-style barbecue grills outsell all other types of grills by a wide margin each year.

Despite these facts, many other individuals choose to utilize propane grills due to their perceived ease of use and low maintenance. To this end, such individuals recognize the significant difference in cost, but are still hesitant to use wood or charcoal because they feel it is difficult to light and requires too much maintenance to maintain.

Accordingly, it would be beneficial to provide a cartridge ignition system that can be used with charcoal-style grills to alleviate the above noted drawbacks.

SUMMARY OF THE INVENTION

The present invention is directed to a cartridge ignition system. One embodiment of the present invention can include a main body having a plurality of walls that define a hollow interior space, and an ignition cartridge that is positioned within the interior space.

In one embodiment, the ignition cartridge can include a plurality of bracing elements that are joined together via a plurality of elongated rods, and an elongated wick that extends along the length of the ignition cartridge. The wick can include a layered construction that is designed to burn longitudinally along the length of the ignition cartridge.

In one embodiment, a fuel source is positioned within the main body and is in communication with the plurality of bracing elements and elongated rods. In the embodiment, the wick is positioned along a central portion of the ignition cartridge and is separated from each of the plurality of elongated rods and the fuel source by an air gap.

In one embodiment, the main body includes a plurality of apertures for permitting airflow through the system during operation, and each of the main body and the ignition cartridge are constructed from combustible materials that are configured to be consumed during system operation.

This summary is provided merely to introduce certain concepts and not to identify key or essential features of the claimed subject matter.

BRIEF DESCRIPTION OF THE DRAWINGS

Presently preferred embodiments are shown in the drawings. It should be appreciated, however, that the invention is not limited to the precise arrangements and instrumentalities shown.

DETAILED DESCRIPTION OF THE INVENTION

Figure 1:
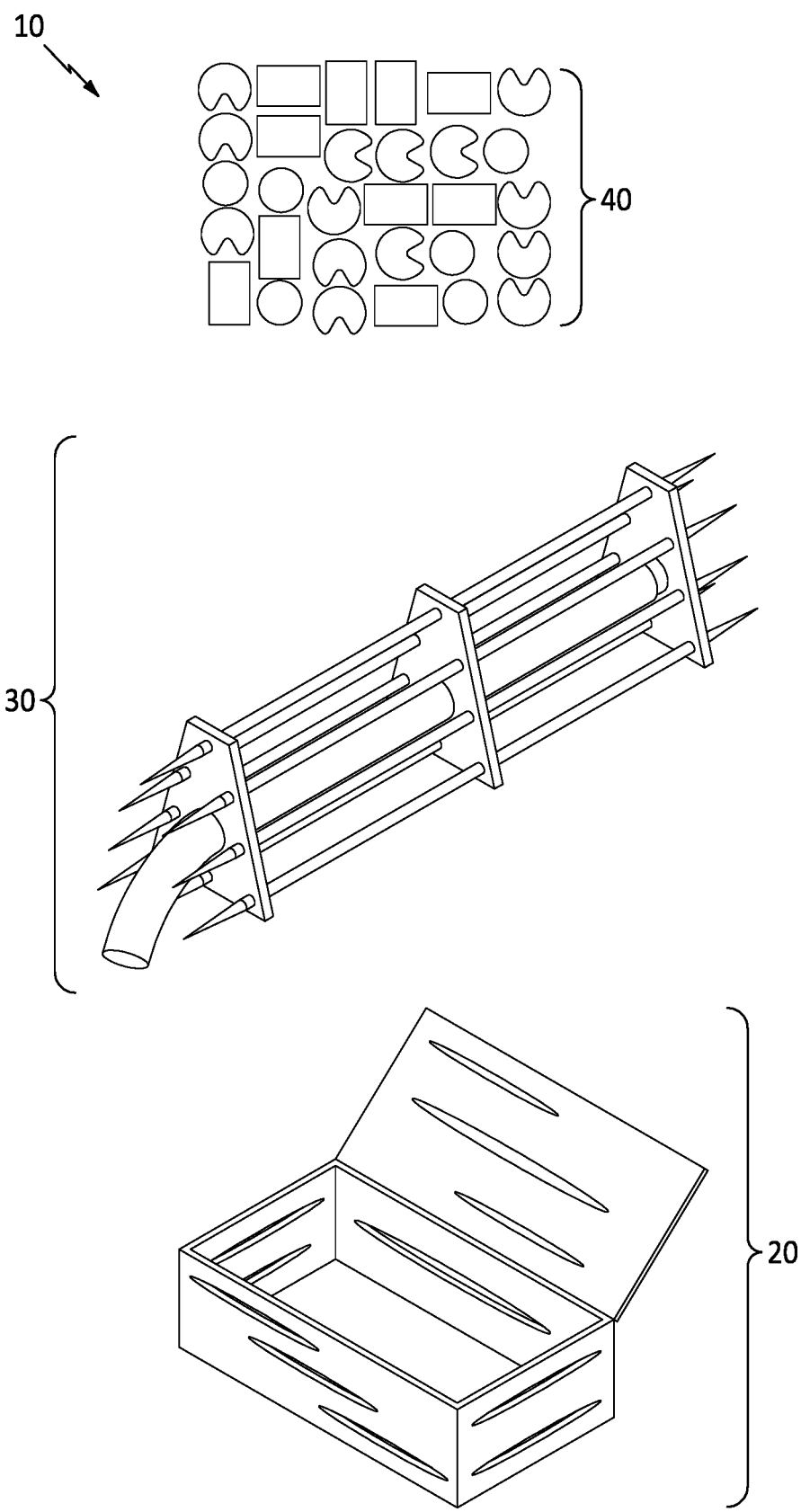
FIG. 1 is an exploded parts view of a cartridge ignition system that is useful for understanding the inventive concepts disclosed herein.

While the specification concludes with claims defining the features of the invention that are regarded as novel, it is believed that the invention will be better understood from a consideration of the description in conjunction with the drawings. As required, detailed embodiments of the present invention are disclosed herein; however, it is to be understood that the disclosed embodiments are merely exemplary of the invention which can be embodied in various forms. Therefore, specific structural and functional details disclosed herein are not to be interpreted as limiting, but merely as a basis for the claims and as a representative basis for teaching one skilled in the art to variously employ the inventive arrangements in virtually any appropriately detailed structure. Further, the terms and phrases used herein are not intended to be limiting but rather to provide an understandable description of the invention.

Definitions

As described herein, a "unit" means a series of identified physical components which are linked together and/or function together to perform a specified function.

As described throughout this document, the term "about" "approximately" "substantially" and "generally" shall be used interchangeably to describe a feature, shape or measurement of a component within a tolerance such as, for example, manufacturing tolerances, measurement tolerances or the like.

As described herein, the term "removably secured," and derivatives thereof shall be used to describe a situation wherein two or more objects are joined together in a non-permanent manner so as to allow the same objects to be repeatedly joined and separated.

As described throughout this document, the term "complementary shape," and "complementary dimension," shall be used to describe a shape and size of a component that is identical to, or substantially identical to the shape and size of another identified component within a tolerance such as, for example, manufacturing tolerances, measurement tolerances or the like.

FIGS. 1-5 illustrate one embodiment of a cartridge ignition system 10 that are useful for understanding the inventive concepts disclosed herein. In each of the drawings, identical reference numerals are used for like elements of the invention or elements of like function. For the sake of clarity, only those reference numerals are shown in the individual figures which are necessary for the description of the respective figure. For purposes of this description, the terms "upper," "bottom," "right," "left," "front," "vertical," "horizontal," and derivatives thereof shall relate to the invention as oriented in FIG. 1.

FIG. 1 illustrates one exemplary embodiment of a cartridge ignition system 10 that includes a main body 20, an ignition cartridge 30 and a fuel source 40.

Figure 2:
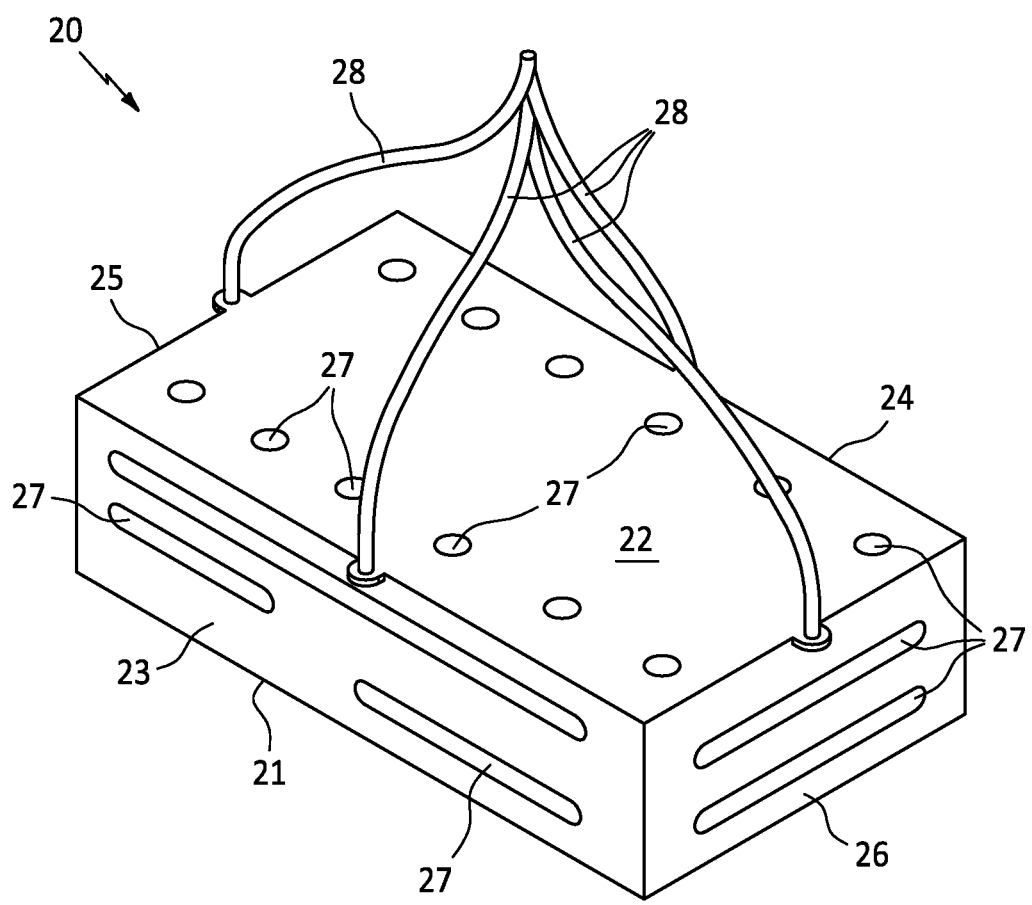
FIG. 2 is a perspective view of the main body of the cartridge ignition system in accordance with one embodiment of the invention.

As shown at FIG. 2, one embodiment of the main body 20 can include a generally rectangular-shaped member having a bottom wall 21, a top wall 22, and a plurality of side walls 23, 24, 25, and 26 that define a hollow interior space. In the preferred embodiment, a plurality of elongated slits 27 and/or apertures can be disposed along one or more of the walls 21-26 to provide airflow through the system during operation. Likewise, any number of gripping members such as the illustrated ropes 28, handles or other such components may be provided to aid a user in lifting, positioning or otherwise transporting the main body.

In one preferred embodiment, the main body is intended to be consumed by the fire generated by the system during operation. As such, the main body may be constructed from any number of lightweight flammable materials such as cardboard or thin wood, for example, having a low ignition temperature (e.g., at or below 425° F.). Of course, any number of other materials are also contemplated.

In another embodiment, a portion of the main body such as the bottom wall and side walls, for example, may be constructed from a reusable material such as aluminum, for example, so as to form a tray into which the ashes from the remaining system components can rest upon completion of the use of the system.

Although described above with regard to a generally rectangular shape, this is for illustrative purposes only. As such, the main body may be constructed to include any number of different shapes such as square, rectangular, or oval, among others, for example, along with any number of different sizes. To this end, some embodiments are contemplated wherein the main body is shaped and sized so as to be complementary to the pit area of a particular make or model charcoal grill having known dimensions. Such a feature allowing certain embodiments of the invention to be marketed as being "for use with" any number of commercially available grills. Such a feature being advantageous for allowing a consumer to verify the system will work with a particular grill they own or plan to purchase.

Figure 3A:
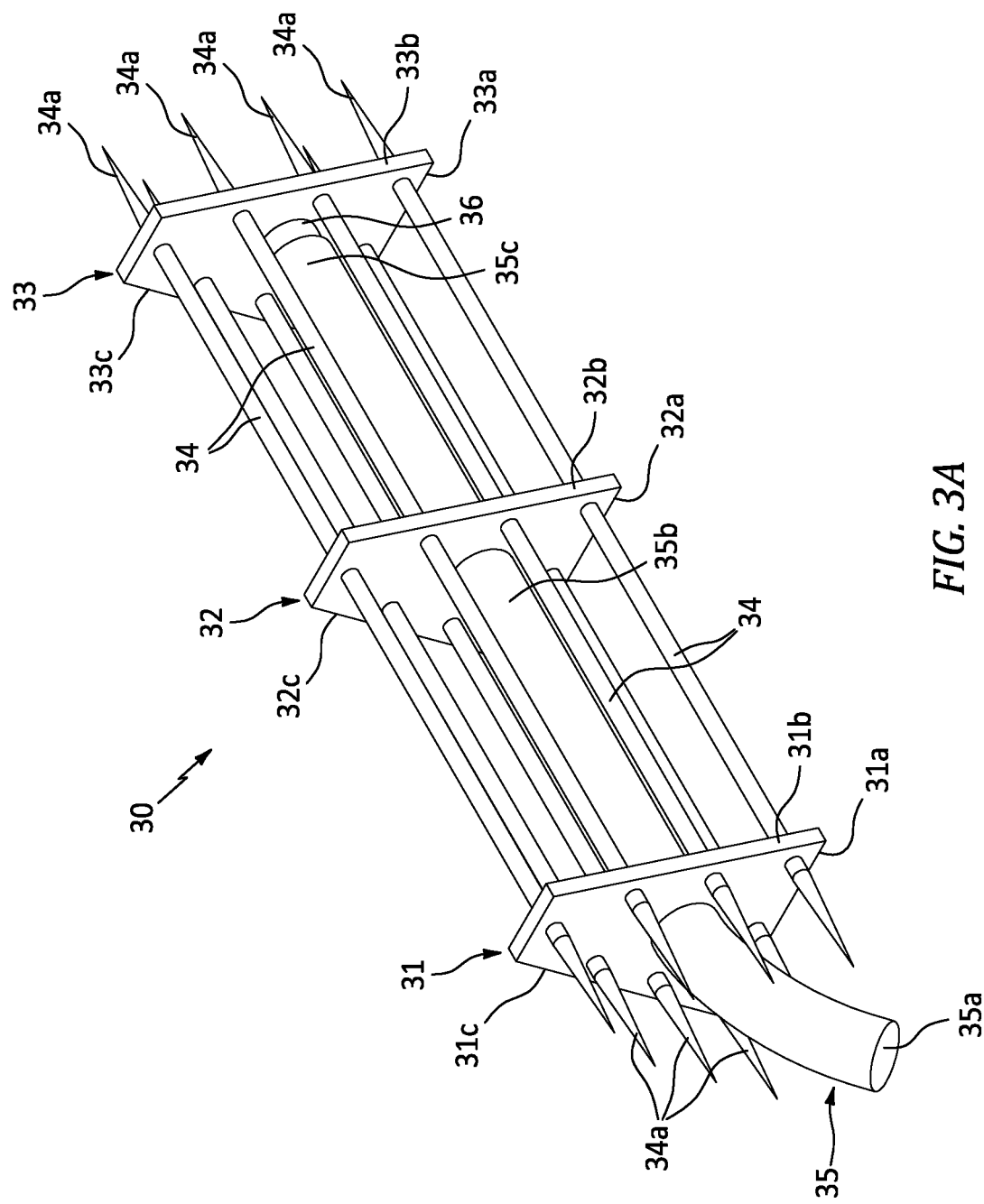
FIG. 3A is a perspective view of the ignition cartridge of the cartridge ignition system in accordance with one embodiment of the invention.
Figure 3B:
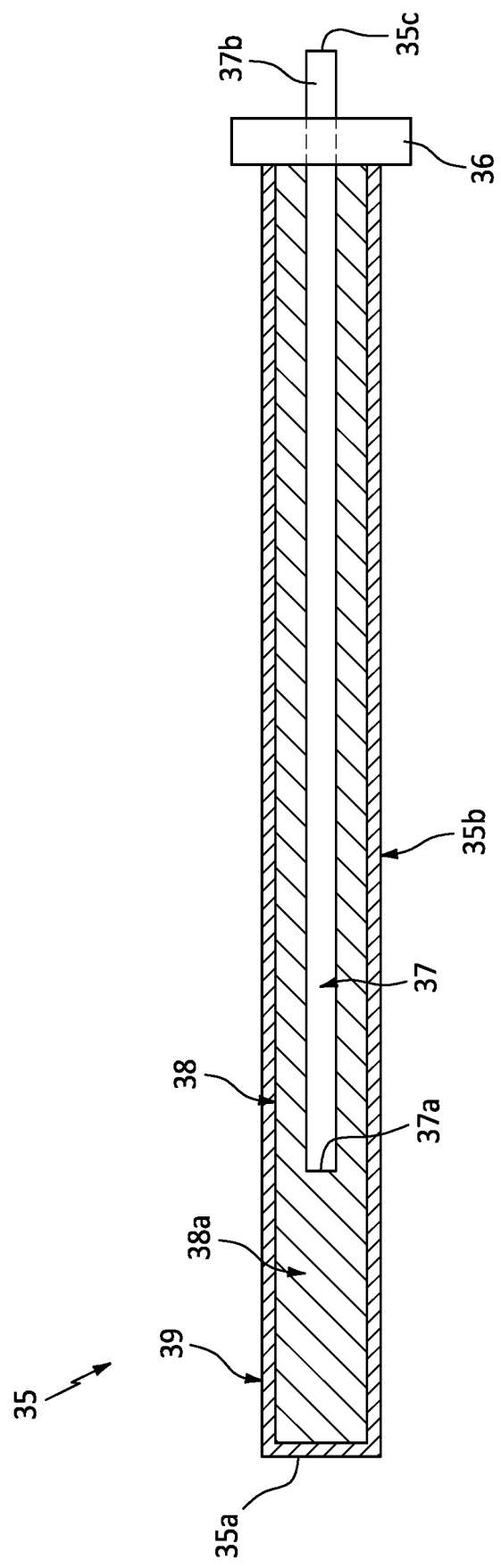
FIG. 3B. is a cross sectional view of the wick of the cartridge ignition system in accordance with one embodiment of the invention.

FIGS. 3A and 3B illustrate one embodiment of an ignition cartridge assembly 30, which can be positioned within the hollow interior space of the main body 20 and can function to provide a sustained flame to the fuel source also located therein.

In one embodiment, the assembly can include a first brace 31 along a proximal end of the assembly, at least one middle brace 32 along the middle of the assembly, and a third brace 33 along a distal end of the assembly. In the illustrated embodiment, each of the braces 31-33 can include generally triangular-shaped members having a bottom wall 31a, 32a and 33a, and angular side walls 31b-31c, 32b-32c and 33b-33c, respectively. Additionally, the first and middle braces 31 and 32 can each include an opening 31d and 32d, respectively through which the main body of the wick 35 can be positioned.

In the illustrated embodiment, a plurality of elongated rods 34 can be positioned horizontally between each of the braces 31-33. In one embodiment, each of the rods can include pointed ends 34a that can extend past the first brace 31 and/or the third brace 33. In such an embodiment, the pointed ends can function to engage and/or penetrate the side walls of the main body 20 in order to prevent movement of the cartridge once secured therein.

As will be described below, the braces 31-33 and the elongated rods 34 function to support and position the wick 35 during operation of the system. As such, in the preferred embodiment the braces and rods will each be constructed from wood or a woody grass, such as bamboo, for example, so as to provide the structural rigidity needed to support the wick, while also being able to be ultimately consumed by the fire generated by the system during operation. Of course, any number of other materials which may or may not be consumable in nature are also contemplated.

Although described and illustrated with regard to three braces each having a generally rectangular shape, this is for illustrative purposes only. As such, the assembly can include any number of different braces and/or elongated rods, each having any number of different shapes, sizes, and construction materials. Such a feature advantageously functioning to provide additional fuel for the fire produced by the system.

As shown, the wick 35 can include an elongated member having a first end 35a that can extend outward from the first brace 31, a middle portion 35b that passes through the second brace 32, and a second end 35c. In one embodiment, a plug 36 can be positioned along the second end 35c and can act as a cap for the below described sleeve and permeable body sections.

In the preferred embodiment, the wick 35 can include a layered construction, wherein each layer performs a different and specific function. As illustrated in the cross-sectional illustration of FIG. 3B, one embodiment of the wick 35 can include a wire core 37 that is surrounded by a permeable layer 38 and an outer sleeve 39.

In the preferred embodiment, the core 37 can be constructed from an elongated strip of bamboo or from a metallic wire such as steel or aluminum, for example, and can function to support the weight of the wick and maintain the shape of the wick which is suspended between the braces 31-33 as described above. To this end, the core can include a length from a first end 37a to a second end 37b that is at least as long as the distance between the first brace 31 and the third brace 33 so as to engage the same. In either instance, the core 37 can terminate at, within or beyond the plug 36. By extending beyond the plug, the core can create a gap to prevent the oils and other such materials infused into the wick from contacting the third brace 33 of the assembly and/or the main body 20.

In one embodiment, the permeable layer 38 can be constructed from any number of liquid permeable materials such as pure cotton, cotton or blended fabrics, paper filaments, and other such material commonly used for wicks, for example. As shown, the layer 38 may include a length that is greater than the length of the core 37, as the first end of the wick 35a is intended to be routed through the main body so as to be lit by an end user. In either instance, the permeable layer 38 can be infused with any number of different types of oils 38a such as vegetable oils or animal fat, for example, to control the rate at which the wick burns.

In one embodiment, an outer sleeve 39 can be positioned along a portion or the entirety of the permeable layer to prevent leakage of the oils, and/or to prevent the oils from drying out. The sleeve may be constructed from any number of air and/or water-resistant materials such as cellophane, for example.

Although described above with regard to a layered construction and/or particular materials, this is for illustrative purposes only, as the wick can be constructed from any number of different materials and in accordance with any number of other construction methodologies to provide a sustained flame for engaging the fuel source in the manner described herein.

Returning to FIG. 3A, the wick 35 is positioned separate from, and parallel to each of the plurality of rods 34. In this regard, the three-dimensional orientation of the braces and rods are specifically designed to create a cage that surrounds the wick, in order to prevent the wick from making direct contact with the fuel source. To this end, these components 31-34 advantageously and critically create an air gap between the wick and fuel source that permits the wick to perform a continuous controlled burn longitudinally—e.g., from the first end 35a to the second end 35c—over time. Without the air gap, the entire body of the wick would catch fire (from its contact with the fuel source) at once, thus causing the wick to burn out rapidly.

Figure 4A:
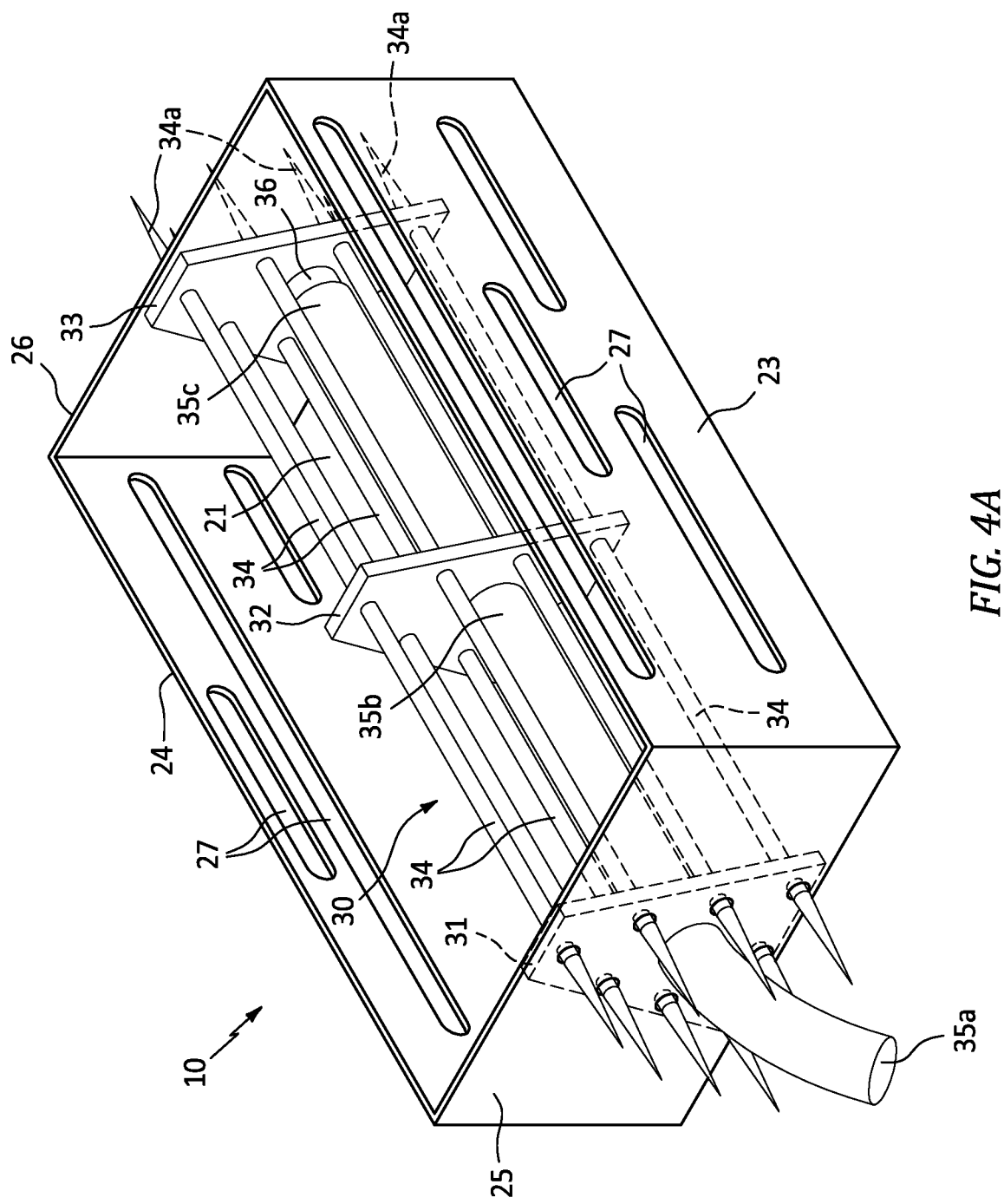
FIG. 4A is a perspective view of the cartridge ignition system in accordance with one embodiment of the invention.
Figure 4B:
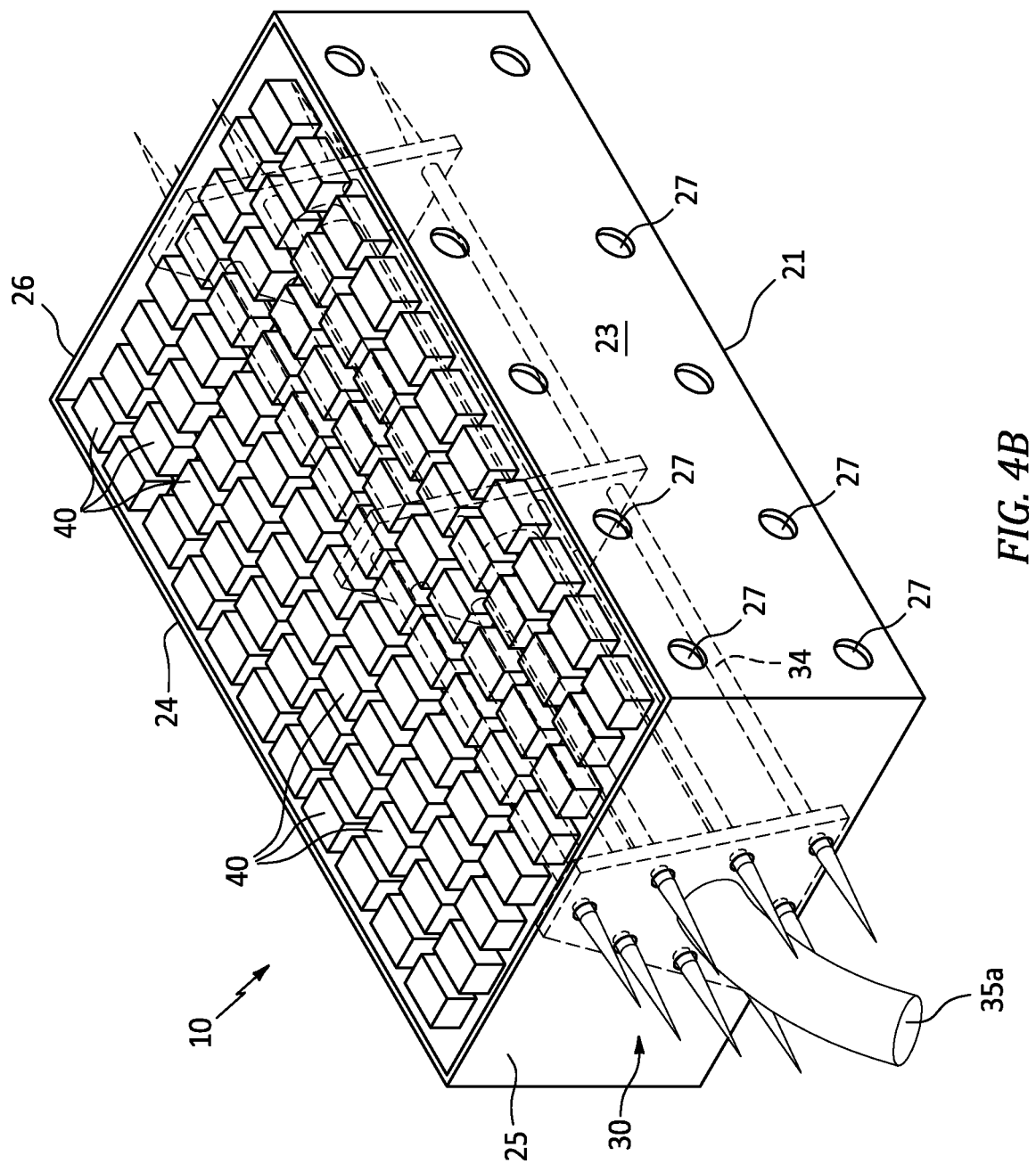
FIG. 4B is another perspective view of the cartridge ignition system in accordance with one embodiment of the invention.

As shown best at FIGS. 4A and 4B, wherein the top wall of the main body is removed for ease of illustration, the cartridge assembly can be positioned within the hollow interior space of the main body so as to extend between two of the side walls (e.g., 25 and 26). When so positioned, the distal ends of the shafts 34a can engage and partially or fully penetrate the sides of the main body 25 and/or 26 to prevent movement of the assembly.

Next, the fuel source 40 can be added to the interior of the main body. As described herein, the fuel source can include any number of combustible items that are safe for use as a means for cooking food items for human consumption. Several nonlimiting examples include charcoal, wood chips, briquettes and/or various paper products, for example. In one embodiment, flavor additives such as mesquite or cedar, for example, can be added to the fuel source to provide smoked flavor to the end product or otherwise enhance the flavor of the same.

As noted above, the presence and alignment of the elongated rods 34 prevent the fuel source from making direct contact with the wick as the wick burns from end to end. In this regard, each component of the fuel source specifically includes a shape and size that is larger than the gap(s) between the elongated rods.

Although illustrated with regard to a single ignition cartridge 30 within the main body, this is for illustrative purposes only. To this end, other embodiments of the system are contemplated wherein multiple ignition systems are placed within a single main body. The wicks of each of these systems may be positioned through openings 27 so as to be independently lit by an end user (e.g., parallel configuration). Moreover, in some instances the wicks may be tied together such that a subsequent wick will be ignited when the flame from a previous wick is at or near the second end (e.g., serial configuration).

In either instance, the fuel source 40 may be positioned within the main body so as to have any number of different relationships with the ignition cartridge(s) 30 positioned therein. To this end, the fuel source may be positioned so as to include layers of material that are positioned above, below and/or along the sides of the ignition cartridge(s).

Figure 5:
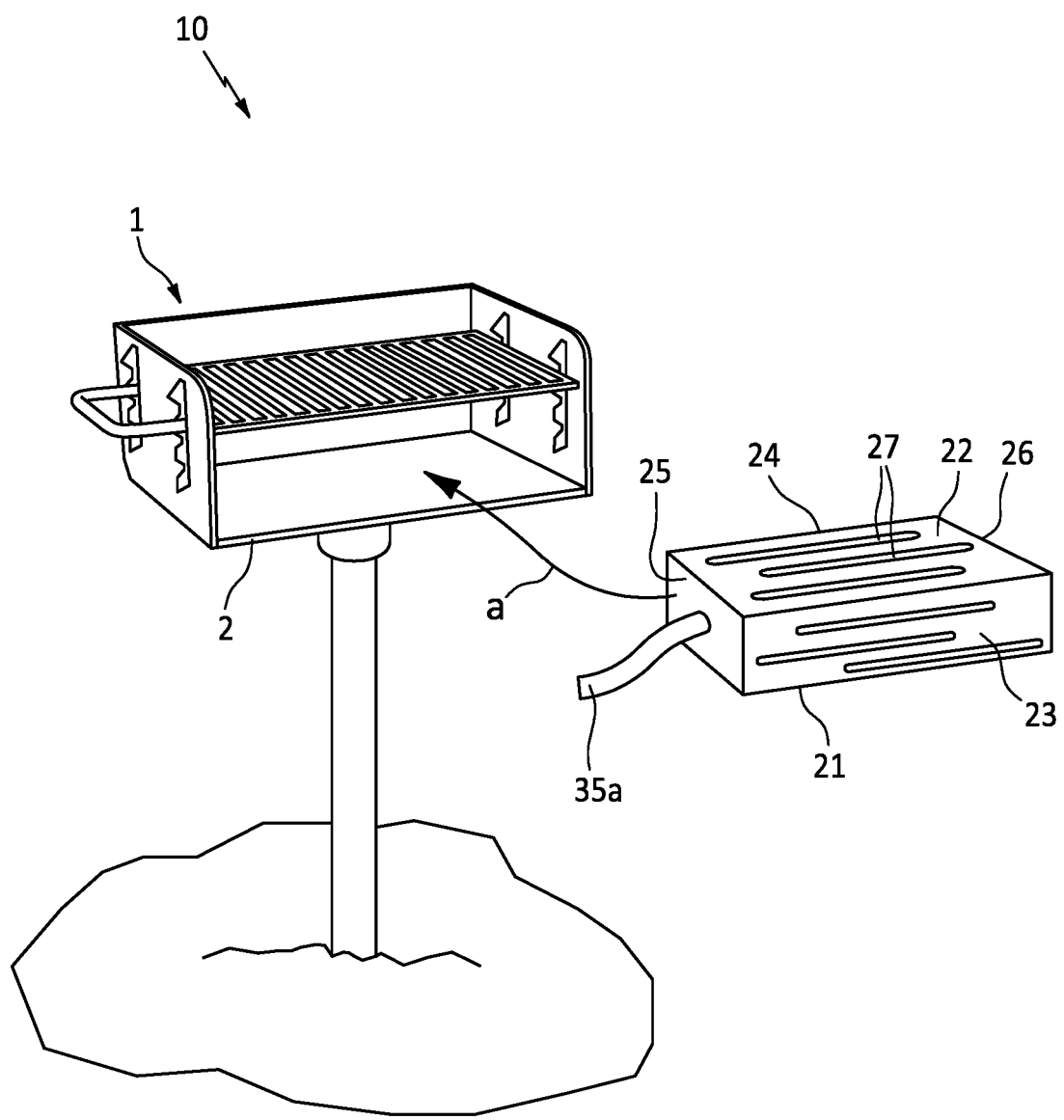
FIG. 5 is a perspective view of the cartridge ignition system in operation, in accordance with one embodiment of the invention.

In either instance, FIG. 5 illustrates one embodiment of the finished system 10 in operation. As shown by arrow a, when a user acquires the system, they can simply place the main body into the pit area 2 of a grill 1 of their choice and light the exposed first end of the wick 35a. At this time, the wick will burn from end to end while igniting the fuel source 40 located inside the main body along the way. Ultimately, the main body 20, braces 31-33 and support rods 34 will also be consumed by the fire leaving only ashes needing to be cleaned.

Although illustrated with regard to the system being slid into a rectangular-shaped grill this is for illustrative purposes only, as the system can also be lowered into the pit area of a kettle-style grill or fire pit, among others, for example. Moreover, other embodiments are contemplated wherein the bottom and sides of the main body are constructed from a reusable material such as aluminum, wherein all of the ashes from the main body lid, fuel source and ignition cartridge are contained within the main body tray for easy disposal.

Accordingly, the above-described system provides a novel means for cooking or otherwise providing a fire in a charcoal-style grill that is not rendered obvious by any of the known art.

As described herein, one or more elements of the cartridge ignition system 10 can be secured together utilizing any number of known attachment means such as, for example, glue and compression fittings, among others. Moreover, although the above embodiments have been described as including separate individual elements, the inventive concepts disclosed herein are not so limiting. To this end, one of skill in the art will recognize that one or more individually identified elements may be formed together as one or more continuous elements, either through manufacturing processes, such as casting, or molding, or through the use of one or more singular pieces of material milled or machined with the aforementioned components forming identifiable sections thereof.

As to a further description of the manner and use of the present invention, the same should be apparent from the above description. Accordingly, no further discussion relating to the manner of usage and operation will be provided.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Likewise, the term "consisting" shall be used to describe only those components identified. In each instance where a device comprises certain elements, it will inherently consist of each of those identified elements as well.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. A system, comprising:
   a main body having a bottom wall, a top wall and a plurality of side walls that define a hollow interior space;
   a plurality of apertures that are disposed along the main body;
   at least one ignition cartridge that is positioned within the main body, each of the at least one ignition cartridge including a plurality of bracing elements and a plurality of elongated rods;
   an elongated wick that is in communication with the at least one ignition cartridge; and
   a fuel source that is positioned within the main body.

2. The system of claim 1, wherein the at least one ignition cartridge extends between two of the plurality of main body side walls that are located opposite to each other.

3. The system of claim 2, wherein the wick extends along a length of the ignition cartridge and is positioned within the ignition cartridge so as to be physically separated from the fuel source.

4. The system of claim 3, wherein the wick includes a first end and a second end, and wherein the first end is positioned through one of the plurality of apertures in the main body and is located outside of the main body.

5. The system of claim 4, wherein the wick is constructed from a combustible material and is configured to burn longitudinally from the first end to the second end.

6. The system of claim 1, wherein the plurality of bracing elements includes a first bracing element that is in communication with one of the plurality of side walls of the main body, a second bracing element that is in communication with another of the plurality of side walls of the main body, and at least one middle bracing element that is positioned between the first bracing element and the second bracing element.

7. The system of claim 6, wherein each of the first bracing element and the at least one middle bracing element include a wick opening for receiving and positioning the wick within the main body.

8. The system of claim 7, wherein the wick is positioned through the wick openings, and wherein each of the plurality of elongated rods are positioned parallel to the wick.

9. The system of claim 8, wherein a first end of the wick is positioned outside of the main body.

10. The system of claim 1, wherein the fuel source includes, at least one of charcoal, wood chips, or briquettes.

11. The system of claim 10, wherein the fuel source is positioned within the main body so as to surround the at least one ignition cartridge.

12. The system of claim 1, wherein the main body is constructed from a combustible material.

13. The system of claim 12, wherein the main body is constructed from at least one of cardboard or wood.

14. The system of claim 13, wherein the at least one ignition cartridge is constructed from a combustible material.

15. The system of claim 14, wherein the at least one ignition cartridge is constructed from at least one of a wood or woody grass material.

* * * * *